US012525724B2

(12) United States Patent
Yang et al.

(10) Patent No.: US 12,525,724 B2
(45) Date of Patent: Jan. 13, 2026

(54) ULTRA-WIDEBAND CIRCULAR-POLARIZED RADIATION ELEMENT WITH INTEGRATED FEEDING

(71) Applicant: Gapwaves AB, Gothenburg (SE)

(72) Inventors: Jian Yang, Mölndal (SE); Thomas Emanuelsson, Västra Frolunda (SE)

(73) Assignee: GAPWAVES AB, Gothenburg (SE)

( * ) Notice: Subject to any disclaimer, the term of this patent is extended or adjusted under 35 U.S.C. 154(b) by 183 days.

(21) Appl. No.: 18/039,139

(22) PCT Filed: Nov. 4, 2021

(86) PCT No.: PCT/EP2021/080597

§ 371 (c)(1),
(2) Date: May 26, 2023

(87) PCT Pub. No.: WO2022/111965

PCT Pub. Date: Jun. 2, 2022

(65) Prior Publication Data

US 2024/0222880 A1 Jul. 4, 2024

(30) Foreign Application Priority Data

Nov. 30, 2020 (SE) .................................... 2030349-1

(51) Int. Cl.
*H01Q 21/06* (2006.01)
*H01Q 1/52* (2006.01)
(Continued)

(52) U.S. Cl.
CPC ........... *H01Q 21/062* (2013.01); *H01Q 1/523* (2013.01); *H01Q 5/25* (2015.01); *H01Q 11/08* (2013.01)

(58) Field of Classification Search
USPC .......................................................... 343/702
See application file for complete search history.

(56) References Cited

U.S. PATENT DOCUMENTS 9,444,148 B2 * 9/2016 Shashi ................. H01Q 21/067
2007/0194427 A1 * 8/2007 Choi .................. H01L 23/3128
257/E23.125
(Continued)

FOREIGN PATENT DOCUMENTS

CN 104882667 A * 9/2015
CN 110994168 A * 4/2020
WO WO-0079645 A1 * 12/2000 ............... H01Q 1/36

OTHER PUBLICATIONS

Communication Pursuant to Rule 164(2)(b) and Article 94(3) EPC in corresponding European Patent Application No. 21 806 677.7 -1201, 14 pages.
(Continued)

*Primary Examiner* — Dimary S Lopez Cruz
*Assistant Examiner* — Brandon Sean Woods
(74) *Attorney, Agent, or Firm* — Panitch Schwarze Belisario & Nadel LLP

(57) ABSTRACT

An antenna element (100) for an array antenna. The antenna element having a layered configuration comprising a first ground plane (151), a first dielectric layer (140) facing the first ground plane (151), a first planar radiation element (131) facing the first dielectric layer (140), and a feeding via hole (132) arranged electrically connected to the first planar radiation element (131) and arranged extending through the first dielectric layer (140) and through the first ground plane (151) without electrical contact. The antenna element further comprises at least one complementary set comprising a complementary dielectric layer (120) and a complementary planar radiation element (111) facing the complementary dielectric layer. The set is arranged stackable facing the first planar radiation element (131) such that a complementary dielectric layer is arranged between two radiation elements (111, 131) in the layered configuration. The first planar radiation element (131) constitutes a first continuous part of
(Continued)

a spiral antenna and the at least one complementary planar radiation element (111) constitutes a continuation of the spiral antenna, thereby the first and the at least one complementary planar radiation elements (111, 131) constitute an effective spiral antenna.

20 Claims, 9 Drawing Sheets

(51) Int. Cl.
*H01Q 5/25* (2015.01)
*H01Q 11/08* (2006.01)

(56) References Cited

U.S. PATENT DOCUMENTS

2008/0159364 A1* 7/2008 Rofougaran ......... H01Q 1/2283 455/77
2008/0231541 A1 9/2008 Teshirogi et al.

OTHER PUBLICATIONS

Zhang Tian-Ling et al: "Millimeter-Wave Ultrawideband Circularly Polarized Planar Array Antenna Using Bold-C Spiral Elements With Concept of Tightly Coupled Array", IEEE Transactions On Antennas and Propagation, IEEE, USA, vol. 69, No. 4, Oct. 1, 2020, pp. 2013-2022, XP011848243, ISSN: 0018-926X, DOI: 10.1109/TAP.2020.3026873 [retrieved on Apr. 6, 2021].

* cited by examiner

ULTRA-WIDEBAND CIRCULAR-POLARIZED RADIATION ELEMENT WITH INTEGRATED FEEDING

TECHNICAL FIELD

The present disclosure relates array antennas and to radiating antenna elements, particularly antenna elements for array antennas. The array antennas are suited for use in, e.g., telecommunication and radar transceivers.

BACKGROUND

Wireless communication networks comprise radio frequency transceivers, such as radio base stations used in cellular access networks, microwave radio link transceivers used for, e.g., backhaul into a core network, and satellite transceivers which communicate with satellites in orbit. A radar transceiver is also a radio frequency transceiver since it transmits and receives radio frequency signals.

Radio transceivers, in general, comprise antenna devices. An antenna device may comprise an array antenna, which in turn comprises a plurality of radiating elements. Conventionally, the element spacing in an array antenna should be smaller than one wavelength to avoid grating lobes. With this restriction, the most conventional planar array antenna designs adopt an element spacing of roughly $0.8\lambda_{high}$, to achieve high gain and obtain enough space for feeding networks, where $\lambda_{high}$ is the wavelength at the highest operation frequency. Tightly coupled array (TCA) antenna is another kind of array antenna employing small element spacing, i.e., an element spacing less than $0.8\lambda_{high}$. This type of array antenna utilizes the mutual coupling between the radiation elements to obtain ultra-wide bandwidth for wide beam angle scanning.

A drawback of the TCA is that it is challenging to design the feeding network for the radiating elements, such as a corporate feeding network, due to the limited amount of space coming from the small element spacing. Resulting problems are unwanted radiation losses and mutual coupling between adjacent transmission lines in the feeding network. These problems are severe at millimeter-wave (mmWave) frequencies and become worse as the frequency increases.

Circularly polarized (CP) planar array antennas in mmWave bands are highly demanded because of their ability of suppressing multipath interferences and reducing polarization mismatch. However, obtaining wideband CP elements with a corresponding feeding network is very challenging indeed, especially if they are used in a TCA. Another problem for CP arrays is scan angles, if zenith in a spherical coordinate system is perpendicular to the planar array, a CP array typically present a poor axial ratio (AR) at large values of the polar angle, e.g., >45°. The AR ratio at large values of the polar angle may also depend on the azimuth angle and the frequency.

There is a need for improved antenna elements for array antennas that present good performance, in terms of, e.g., gain and AR, across a large bandwidth and for a wide range of scan angles, and that allow low-loss and low-leakage feeding networks.

SUMMARY

It is an object of the present disclosure to provide improved antenna elements for array antennas that present good performance, in terms of, e.g., gain and AR, across a large bandwidth and for a wide range of scan angles, and that allow low-loss and low-leakage feeding networks.

This object is at least in part obtained by an antenna element for an array antenna. The antenna element has a layered configuration comprising: a first ground plane, a first dielectric layer facing the first ground plane, a first planar radiation element facing the first dielectric layer, and a feeding via hole arranged electrically connected to the first planar radiation element and arranged extending through the first dielectric layer and through the first ground plane without electrical contact. The antenna element further comprises at least one complementary set comprising a complementary dielectric layer and a complementary planar radiation element facing the complementary dielectric layer. The set is arranged stackable facing the first planar radiation element such that a complementary dielectric layer is arranged between two radiation elements in the layered configuration. The first planar radiation element constitutes a first continuous part of a spiral antenna and the at least one complementary planar radiation element constitutes a continuation of the spiral antenna, thereby the first and the at least one complementary planar radiation elements constitute an effective spiral antenna.

The first and the at least one complementary planar radiation elements constitute an effective spiral antenna. In other words, an effective spiral antenna has been split into two or more parts. According to aspects, the antenna element is a circular polarized antenna element.

A single-arm multi-turn spiral antenna in a single plane can be fed by a simple feeding structure with excellent wideband performance. However, the size may be too large for an array antenna. Therefore, splitting of the spiral antenna into several parts in different layers according to the present disclosure enables multiple turns of a spiral antenna while maintaining a small footprint. This facilitates constructing an array antenna, such as a TCA.

The single feeding structure is one of the advantages of the disclosed element, which makes the corporate network simple and helpful to achieve wide bandwidth performance within the limited space when using the concept of TCA. The feeding structure is also simpler than the differential feeding structure required in a dual arm spiral antenna.

The antenna element also enables compact antenna arrays, which is beneficial for deployment and manufacturing. The stacked layered structure results in low-cost manufacturing and a robust antenna array.

According to aspects, the first planar radiation element is connected to at least one of the at least one complementary planar radiation element via electromagnetic coupling. This allows simple and cost-effective manufacturing. According to further aspects, the first planar radiation element is electrically connected to at least one of the at least one complementary planar radiation element via a connecting via hole extending through the first dielectric layer. This also allows simple and cost-effective manufacturing.

According to aspects, the effective spiral antenna comprises a single arm with an arcuate form extending from the feeding via hole. According to further aspects, the effective spiral antenna comprises a single arm with substantially constant radius and extends more than a full circle. This way, it the effective antenna effectively spans more than a full circle, which yields excellent performance while requiring minimal space.

According to aspects, the effective spiral antenna comprises a square spiral form. Other spiral forms are also possible.

According to aspects, the first planar radiation element constitutes 50-80 percent of the effective spiral antenna, preferably 60-70 percent.

According to aspects, the length of the inner radius of the effective spiral antenna is substantially equal to a quarter of the wavelength of the highest frequency in a band of operation of the antenna element.

According to aspects, a planar frame is arranged adjacent to the topmost complementary planar radiation element in the layered configuration, and is arranged to surround the effective spiral antenna. The planar frame is electrically connected to the first ground plane with one or more grounding via holes extending through the first and the at least one complementary dielectric layers. According to aspects further aspects, the planar frame comprises a continuous shape. The frame and its grounded via holes can be arranged to constitute an effective cavity. This way, the part of the antenna element surrounded by the grounding vias is electrically isolated from other antenna elements. In other words, electromagnetic coupling is prevented from, e.g., a feeding via of one element to a feeding via of another element.

According to aspects, the antenna element further comprises a second dielectric layer facing the first ground plane, and a planar transmission line arrangement facing the second dielectric layer, wherein the feeding via hole is arranged to further extend through the second dielectric layer and electrically connect to the transmission line arrangement.

According to aspects, the antenna element further comprises a third dielectric layer facing the planar transmission line arrangement, and a fourth dielectric layer facing the third dielectric layer. The fourth dielectric layer comprises an electromagnetic bandgap, EBG, structure arranged to prevent electromagnetic radiation in a frequency band of operation from propagating from the planar transmission line arrangement in directions other than through the feeding via hole and along the at least one planar transmission line arrangement.

EBG structures allow compact designs, low loss, low leakage between adjacent waveguides, and forgiving manufacturing and assembling tolerances. The EBG structure are easy to manufacture at a low-cost. Furthermore, there is no need for electrical contact between the EBG structure and the adjacent layer. This is an advantage since high precision assembly is not necessary and since electrical contact need not be verified. The EBG structure further prevents undesired back radiation.

According to aspects, the EBG structure comprises a second ground plane and a plurality of EBG mushrooms. Each EBG mushrooms comprises a patch and a via hole. The via hole extending through the fourth dielectric layer and is configured to electrically connect the patch to the second ground plane. This way, the EBG structure comprises an easy to manufacture and low-cost structure.

According to aspects, the antenna element further comprises a matching dielectric layer facing the topmost complementary planar radiation element. This way, the impedance matching of the radiating element is improved. This, in turn, leads to, i.a., improved bandwidth performance.

There is also disclosed herein a telecommunication or radar transceiver comprising at least one antenna element.

There is also disclosed herein an array antenna comprising a plurality of antenna elements. This way, all positive effects of the antenna element may be utilized in conjunction with all benefits associated with an array antenna, such as improved directivity.

According to aspects, the transmission line arrangements of all antenna elements in the array antenna constitute a corporate feeding network. This way, a single layer feeding network may feed all the antenna elements in the antenna array.

According to aspects, the antenna elements in the array antenna are sequentially rotated in space with respect to adjacent antenna elements. This improves the scan angles of the array antenna. More specifically, a desired radiation pattern and a good AR can be maintained at large values of the polar angle, e.g., >45°, for a wide range of azimuth angles. Herein zenith in the spherical coordinate system is perpendicular to the planar array. The improved performance comes from a more symmetrical arrangement on average for different polar angles. If all elements are arranged equally, i.e., not sequentially rotated, the same respective part of the elements are facing a certain polar angle, wherein the respective part is dependent on the specific polar angle if the element is not rotationally symmetric. A sequentially rotation average out the effect of non-rotationally symmetric elements.

One benefit of the disclosed array antenna comprising the antenna element is that the feeding structure is simple compared to prior art comprising sequentially rotated antenna elements. In particular, circular polarized array antennas often require sequenced excitation of the elements with different polarization and phases, which makes the element spacing very large and therefore the array performs poorly for large scan angles. Furthermore, despite the rotation, all elements of the disclosed array antenna are fed in the same way, i.e., through the feeding vias, which is a simpler feeding arrangement compared to prior art.

According to aspects, the array antenna comprises at least four antenna elements. The antenna elements are arranged on a grid and wherein each element is rotated $+\varphi$ degrees relative a neighboring element in a first direction along the grid and is rotated $-\varphi$ degrees relative a neighboring element in a second direction orthogonal to the first direction, wherein $0<\varphi<180$ degrees, and preferably $80<\varphi<100$ degrees, and more preferably $\varphi=90$ degrees.

There is also disclosed herein a telecommunication or radar transceiver comprising the array antenna.

There is also disclosed herein a method for producing an antenna element having a layered configuration. The method comprises:

- providing a first ground plane,
- arranging a first dielectric layer to face the first ground plane,
- arranging a first planar radiation element to face the first dielectric layer,
- arranging a feeding via hole to electrically connect to the first planar radiation element and to extend through the first dielectric layer and through the first ground plane without electrical contact, and
- arranging at least one complementary set comprising a complementary dielectric layer and a complementary planar radiation element to face the complementary dielectric layer, wherein the set is arranged stackable facing the first planar radiation element such that a complementary dielectric layer is arranged between two radiation elements in the layered configuration,
- wherein the first planar radiation element constitutes a first continuous part of a spiral antenna and the at least one complementary planar radiation element constitutes a continuation of the spiral antenna, thereby the first and the at least one complementary planar radiation elements constitute an effective spiral antenna.

The methods disclosed herein are associated with the same advantages as discussed above in connection to the apparatuses. There are furthermore disclosed herein control units adapted to control some of the operations described herein.

Generally, all terms used in the claims are to be interpreted according to their ordinary meaning in the technical field, unless explicitly defined otherwise herein. All references to "a/an/the element, apparatus, component, means, step etc." are to be interpreted openly as referring to at least one instance of the element, apparatus, component, means, step etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The present disclosure will now be described in more detail with reference to the appended drawings, where FIGS. 1A, 1B, 1C, and 1D schematically illustrate example antenna elements, FIG. 2 schematically illustrate an example dielectric-based inverted microstrip gap waveguide.

DETAILED DESCRIPTION

Figure 1A:
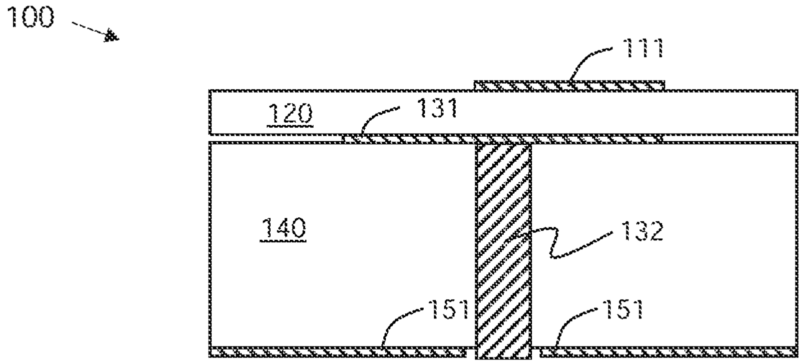

Aspects of the present disclosure will now be described more fully with reference to the accompanying drawings. The different devices and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

The present disclosure discloses an antenna element 100 for an array antenna. The antenna element, and consequently, an array antenna comprising the antenna element 100 present good performance, in terms of, e.g., gain and AR, across a large bandwidth and for a wide range of scan angles, and allow low-loss and low-leakage feeding networks. The array has a compact size and has low manufacturing costs.

Figure 6:
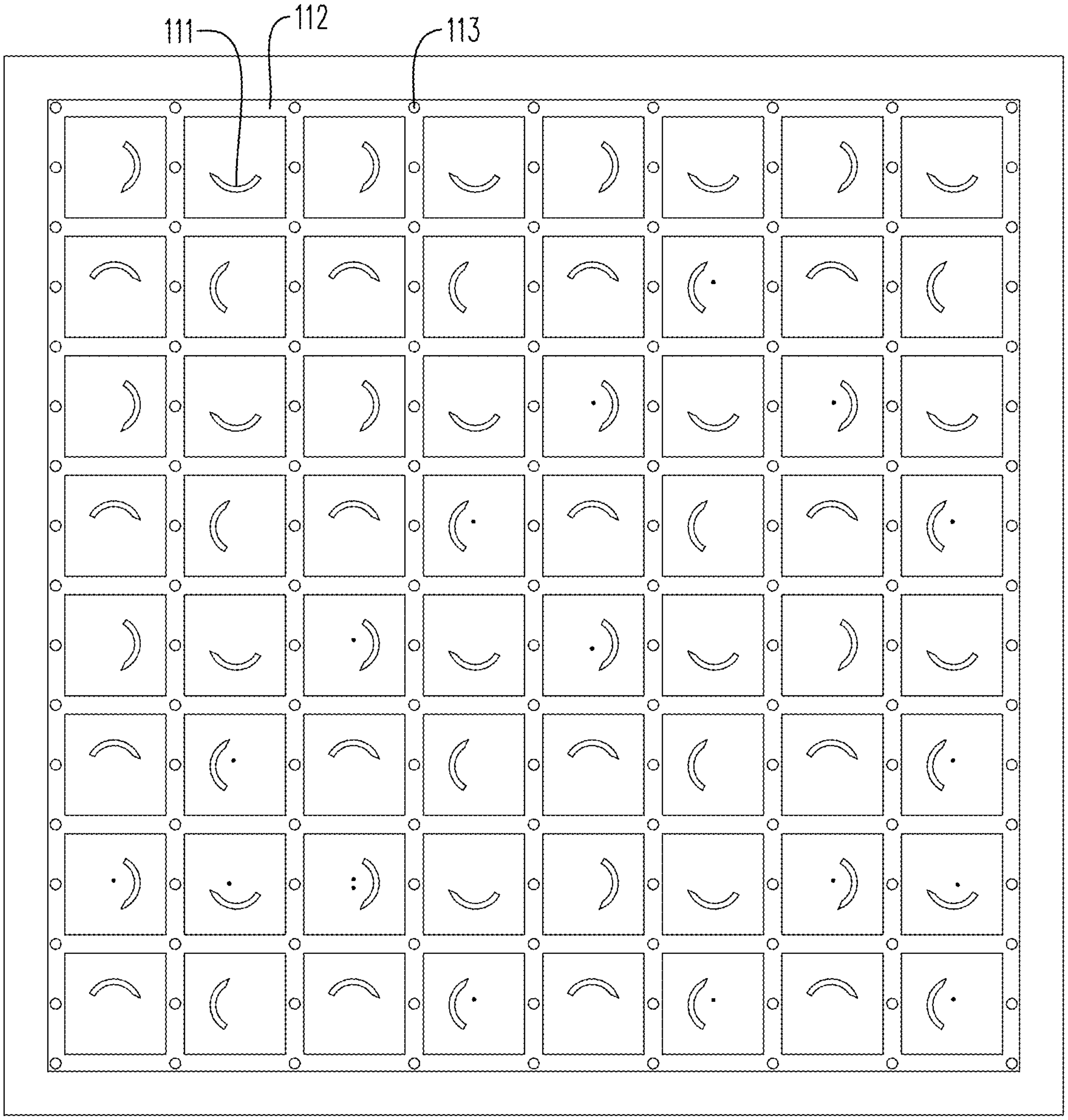
FIG. 6 shows an example array antenna.

FIGS. 1A, 1B, 1C, and 1D show example antenna elements 100 and FIG. 6 shows an example 8×8 array comprising the disclosed antenna element 100. It is appreciated that any array size comprising a plurality of antenna elements 100 is possible. The example elements comprise various numbers of stacked dielectric layers, as is discussed below.

FIG. 1A shows one embodiment of the disclosed antenna element. More specifically, FIG. 1A shows an antenna element 100 for an array antenna. The antenna element has a layered configuration comprising a first ground plane 151, a first dielectric layer 140 facing the first ground plane 151, and a first planar radiation element 131 facing the first dielectric layer 140. The antenna element further comprises a feeding via hole 132 arranged electrically connected to the first planar radiation element 131 and arranged extending through the first dielectric layer 140 and through the first ground plane 151 without electrical contact. The antenna element also comprises at least one complementary set comprising a complementary dielectric layer 120 and a complementary planar radiation element 111 facing the complementary dielectric layer. The set is arranged stackable facing the first planar radiation element 131 such that a complementary dielectric layer is arranged between two radiation elements 111, 131 in the layered configuration. The first planar radiation element 131 constitutes a first continuous part of a spiral antenna and the at least one complementary planar radiation element 111 constitutes a continuation of the spiral antenna. Thereby the first and the at least one complementary planar radiation elements 111, 131 constitute an effective spiral antenna.

According to aspects, the antenna element 100 comprises a single complementary set, wherein the complementary dielectric layer 120 faces the first planar radiation element 131 and wherein the complementary planar radiation element 111 faces the complementary dielectric layer 120.

To have electrical contact means to have galvanic contact, i.e., a direct electrical connection. The feeding via hole 132 is arranged to extend through the first ground plane 151 without electrical contact. This means that there is no galvanic contact between the feeding via hole 132 and the first ground plane 151, i.e., no direct electrical contact. In the example of FIG. 1A, this is achieved by arranging a hole in the first ground plane that is larger than the cross section of the feeding via hole.

Figure 1B:
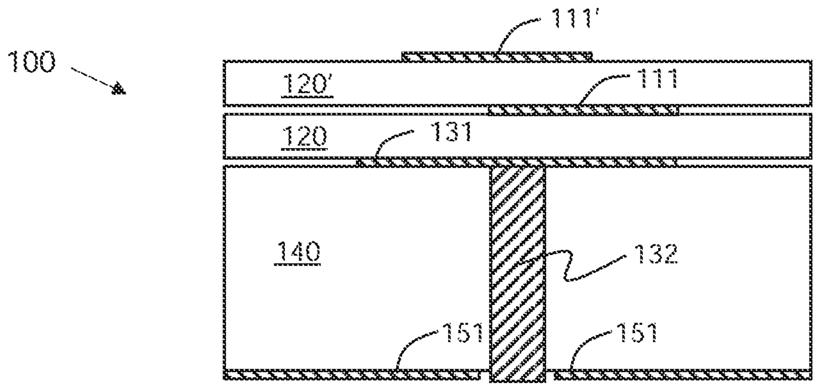
Figure 1C:
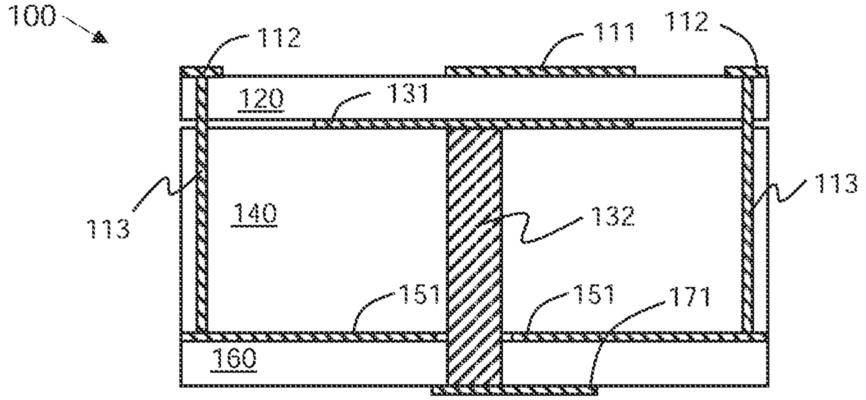
Figure 1D:
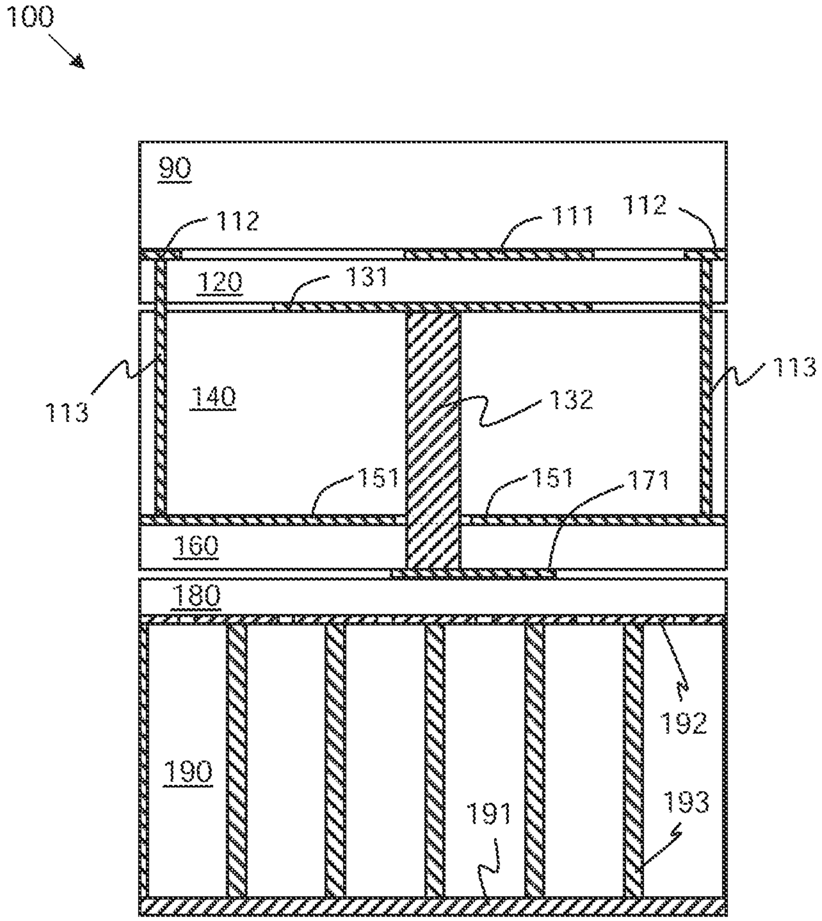

The first and the at least one complementary planar radiation elements 111, 131 constitute an effective spiral antenna. In other words, an effective spiral antenna has been split into two or more parts. FIG. 1A shows an example with two parts: 131 and 111, and FIG. 1B shows an example with three parts: 131, 111, and 111'. According to aspects, the antenna element 100 is a circular polarized antenna element.

A dialectic layer has two sides, or faces, and is associated with respective thickness. The thickness is much smaller than the dimension of the faces.

In an embodiment wherein the antenna element comprises a single complementary set, the complementary planar radiation element 111 may be arranged at a distance from the first planar radiation element 131. This distance is along the plane of the complementary planar radiation element, i.e., in a dimension substantially orthogonal to the thickness of a dielectric layer. If the complementary planar radiation element 111 and the first planar radiation element 131 were to be arranged on the same layer, the distance would be the gap between the two separate continuous shapes of the two parts of the effective spiral antenna. According to aspects, this distance is zero. According to other aspects, the distance may be negative, i.e., the two parts of the effective spiral antenna would overlap if the complementary planar radiation element 111 and the first planar radiation element 131 were to be arranged on the same layer.

According to aspects, the effective spiral antenna has a substantially constant planar width. The planar with is along the plane of a layer in the stacked layered structure. According to further aspects, the distance, as mentioned above, between the complementary planar radiation element 111 and the first planar radiation element 131, is smaller than the planar width of the effective spiral antenna.

In other embodiments, comprising a plurality of complementary sets, the distances between two adjacent complementary planar radiation elements 111 can be the same as the distances discussed above.

A single-arm multi-turn spiral antenna in a single plane can be fed by a simple feeding structure with excellent wideband performance. However, the size may be too large for an array antenna. Therefore, splitting of the spiral antenna into several parts in different layers according to the present disclosure enables multiple turns of a spiral antenna while maintaining a small footprint. This facilitates constructing an array antenna, such as a TCA.

The single feeding structure is one of the advantages of the disclosed element, which makes the corporate network simple and helpful to achieve wide bandwidth performance within the limited space when using the concept of TCA. The feeding structure is also simpler than the differential feeding structure required in a dual arm spiral antenna.

The first planar radiation element 131 may be connected to at least one of the at least one complementary planar radiation element 111 via electromagnetic coupling. The electromagnetic coupling can be inductive or capacitive. Alternatively, the first planar radiation element 131 may be electrically connected to at least one of the at least one complementary planar radiation element 111 via a connecting via hole extending through the first dielectric layer 140.

Figure 5:
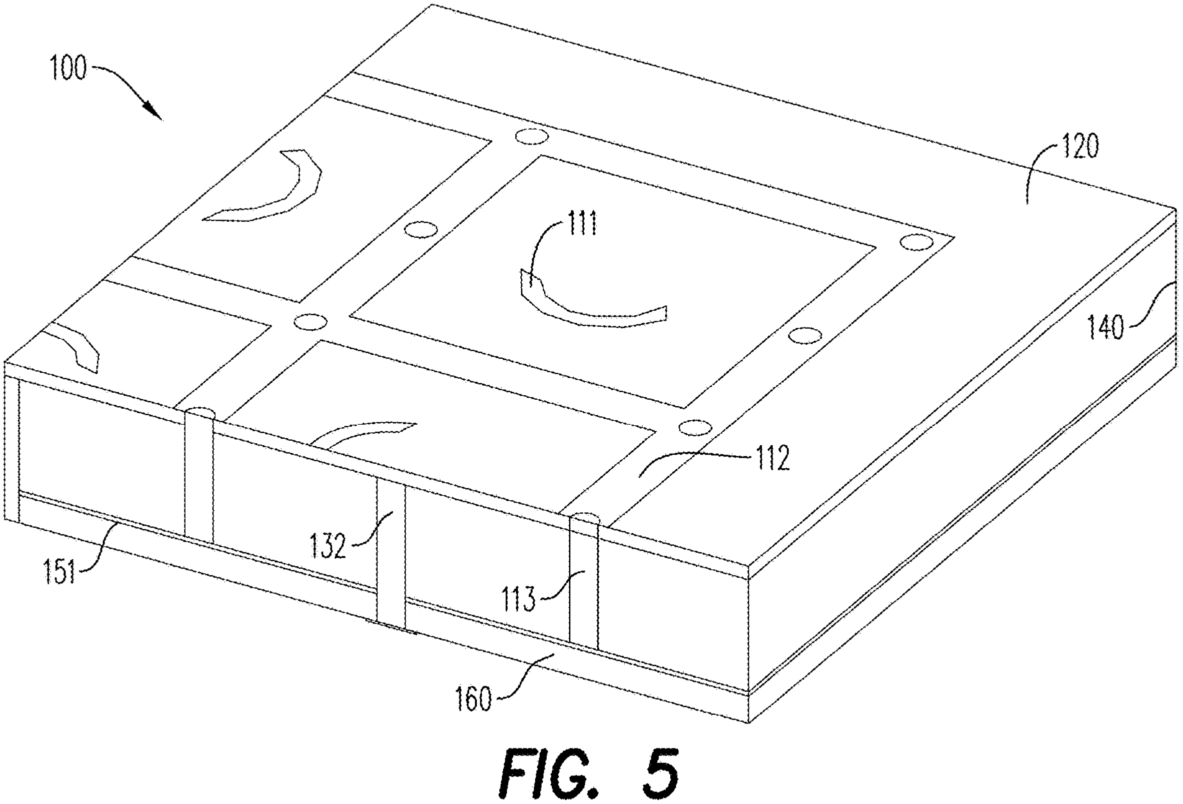
FIG. 5 shows a cut of an example antenna element in an array.

The effective spiral antenna may comprise a single arm with an arcuate form extending from the feeding via hole 132. The effective spiral antenna is distributed among the first planar radiation element 131 and the complementary planar radiation element 111. Furthermore, the effective spiral antenna may comprise a single arm with substantially constant radius and may extend more than a full circle. In FIGS. 3A, 3B, 3C, 4A, 4B, and 4C, which show different angels and cuts of an example antenna element 100, it can be seen that the complimentary planar radiation element 111 effectively extends the first planar radiation element 131 with approximately a quarter lap and with substantially a constant radius, except for where the first planar radiation element 131 is connected to the feeding via 132. FIG. 5 shows a cut of an example array antenna comprising the antenna element 100.

The spiral antenna may comprise a square spiral form. Other spiral shapes are also possible.

The first planar radiation element 131 may constitute 50-80 percent of the effective spiral antenna, preferably 60-70 percent. However, many other division ratios are possible across the two or more parts constituting the effective spiral antenna.

The length of the inner radius of the effective spiral antenna may be substantially equal to a quarter of the wavelength of the highest frequency in a band of operation of the antenna element.

A planar frame 112 may be arranged adjacent to the topmost complementary planar radiation element 111 in the layered configuration. It is arranged to surround the effective spiral antenna, i.e., if the effective spiral antenna would be arranged in a single plane, the frame would surround it. The planar frame is electrically connected to the first ground plane 151 with one or more grounding via holes 113 extending through the first and the at least one complementary dielectric layers 120, 140. The planar frame 112 may comprise a continuous shape, such as rectangular or circular. Other shapes are also possible. The frame may be discontinuous, such as in a plurality of small patches, wherein each patch preferably is connected to the first ground plane.

A multi-layered printed circuit board (PCB) comprises stacked dielectric layers, which are non-conductive. Two example properties of a dielectric layer are the dielectric constant (also called relative permittivity, an example value is 2.2) and dielectric loss (often characterized in terms of a loss tangent, an example value is 0.004). A dielectric layer can be a prepreg or core. A core can also be called a substrate. As such, one of the dielectric layers of the disclosed antenna element 100 can comprise one or more cores, one or more prepregs, or a combination with any number of each.

An example of a core is woven epoxy resin impregnated fiberglass cloth. Another example of a core is an insulated metal substrate. A core may have a thickness in the order of 0.1 to 10 mm, but other thicknesses are also possible. A core may have a conductive foil (e.g. copper) arranged (e.g. laminated) on both or either side of it. The conductive foil may have a thickness in the order of 10-100 micrometers, but other thicknesses are also possible. The conductive foil may be arranged (e.g. by etching) to form different structures, such as a radiating element, planar transmission lines, or a ground plane. In a multilayer PCB, multiple cores may be attached together using prepreg layers in between the core layers. Prepreg (or pre-preg) is short for pre-impregnated composite fiber, and is used as an adhesive, i.e., for bonding different layers together. An example of a prepreg is resin-based material, where the resin is hardened but left uncured. The prepreg act like a glue that holds cores together. When a prepreg is arranged between two cores and is exposed to heat, the resin will bond to the adjacent layers. Then cured, the prepreg will be similar to the core. The thickness of a prepreg may be in the order of 0.1-10 mm, but other thicknesses are also possible.

A via hole (or just via or vertical interconnect access) is an electrical connection that may extend through a single or through multiple dielectric layers. The via may therefore connect different layers of conductive foil layers together. A via may comprise a hole, which is made conductive by incorporating a conductive tube or by electroplating the hole. The diameter of a via hole can, e.g., be in the span 0.1-10 mm, but other diameters are also possible. Other cross-sectional shapes than circular are also possible.

The first planar radiation element 131 may comprise a conductive foil laminated to the first dielectric layer 140. The shape of the first radiating element may be obtained from be etching. The first ground plane 151 may comprise a conductive foil laminated to the first dielectric layer 140.

Dielectric layers can have various types of copper foils, such as standard electrodeposited copper foils, rolled copper foils, resistive copper foils, etc. produced by different manufacturing processes. Different types of copper foils have different surface roughness, which affects the conductor losses of transmission lines in mmWave bands significantly.

The antenna element 100 may further comprise a second dielectric layer (160) facing the first ground plane 151, and a planar transmission line arrangement 171 facing the second dielectric layer 160. The feeding via hole 132 is then arranged to further extend through the second dielectric layer 160 and electrically connect to the transmission line arrangement 171.

The first ground plane 151 may comprise a conductive foil laminated to the second dielectric layer 160. The first ground plane 151 may alternatively or in combination comprise a conductive foil laminated to the first dielectric layer 140. The transmission line arrangement 171 may comprise a conductive foil laminated to the second dielectric layer 160. A planar transmission line is a transmission lines wherein the electrical conductor (e.g. copper) is flat. Examples of planar transmission line are microstrip, strip-line and coplanar waveguide.

The antenna element 100 may further comprise a third dielectric layer 180 facing the planar transmission line arrangement 171, and a fourth dielectric layer 190 facing the third dielectric layer 180. The fourth dielectric layer comprises an electromagnetic bandgap, EBG, structure 191, 190, 193 arranged to prevent electromagnetic radiation in a frequency band of operation from propagating from the planar transmission line arrangement 171 in directions other than through the feeding via hole 132 and along the at least one planar transmission line arrangement 171.

The EBG structure may comprise a second ground plane 191 and a plurality of EBG mushrooms. Each EBG mushrooms comprises a patch 192 and a via hole 193. The via hole is extending through the fourth dielectric layer 190 and is configured to electrically connect the patch 19) to the second ground plane 191.

Figure 2:
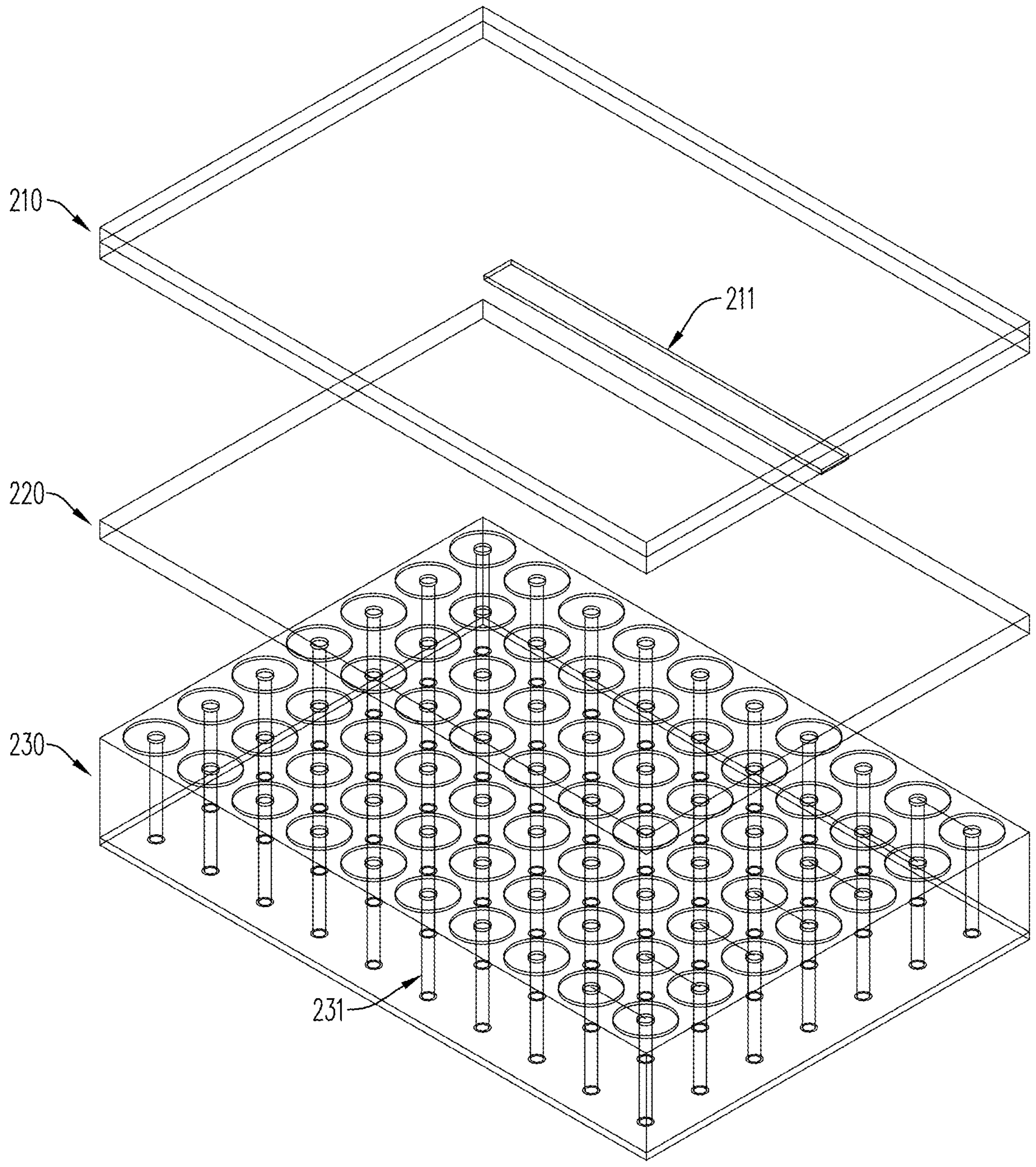
Figure 3A:
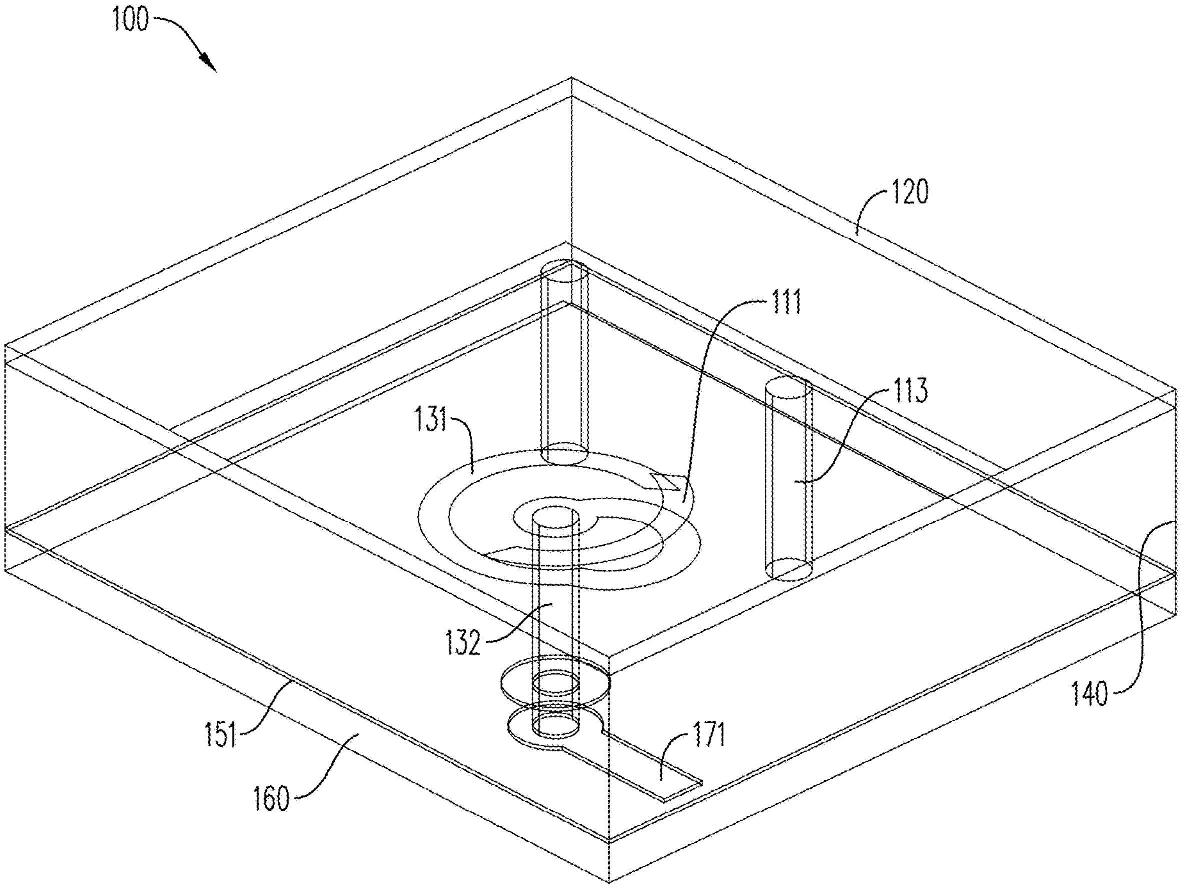
FIGS. 3A, 3B, and 3C show different views of an example antenna element.
Figure 3B:
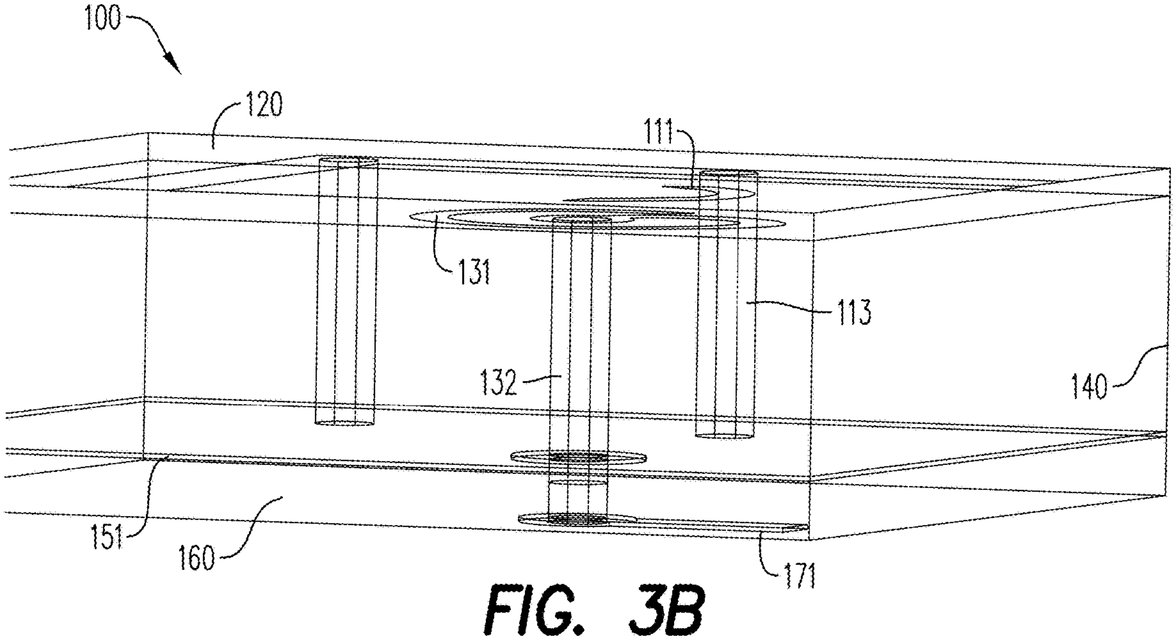
Figure 3C:
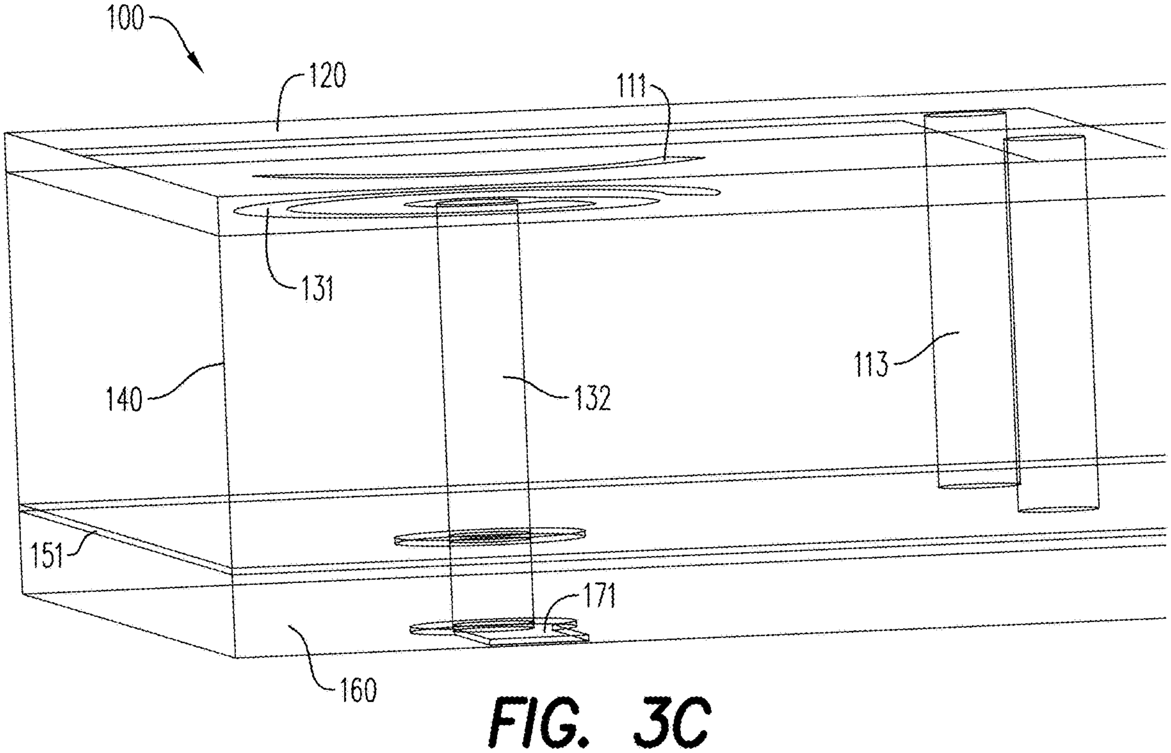
Figure 4A:
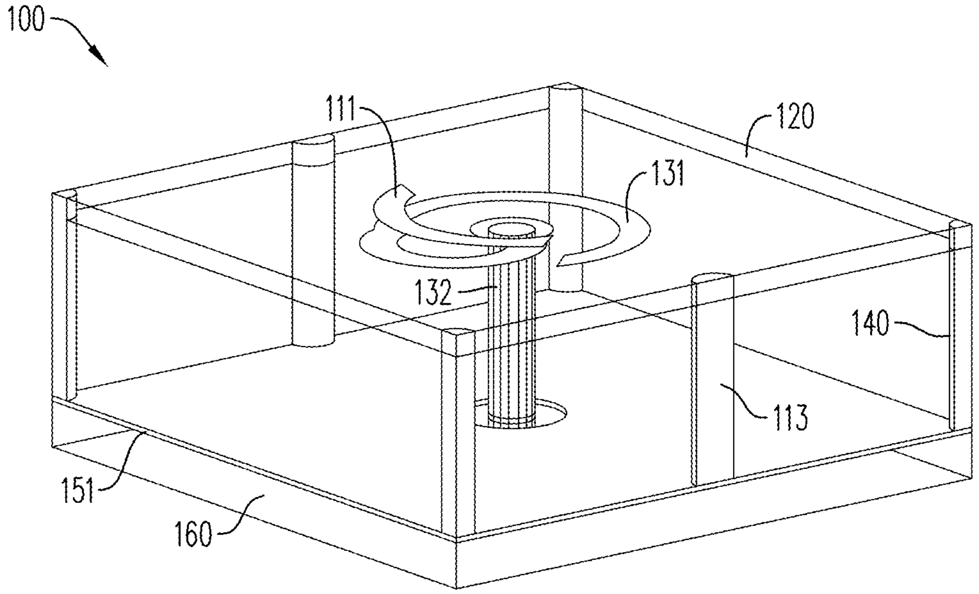
FIGS. 4A, 4B, and 4C show different cuts of an example antenna element.
Figure 4B:
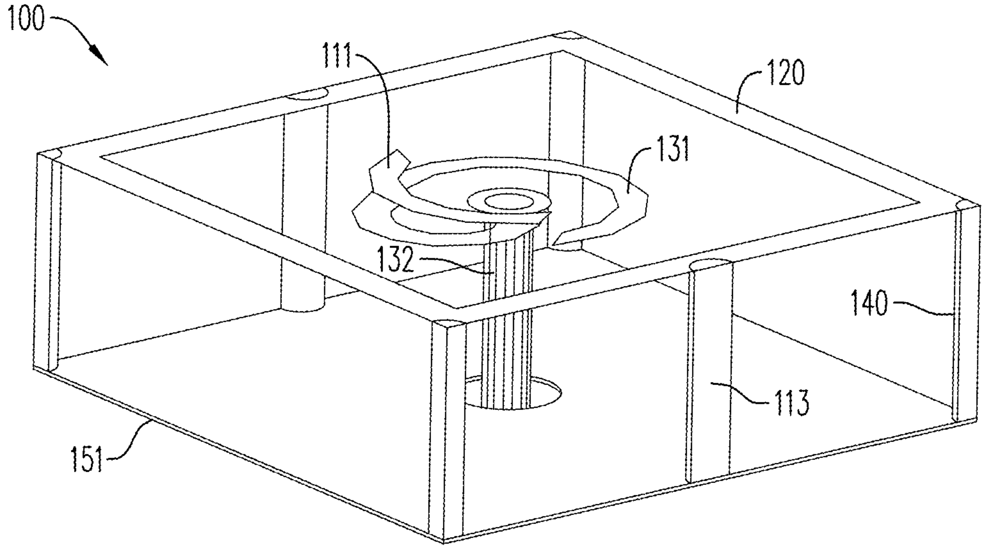
Figure 4C:
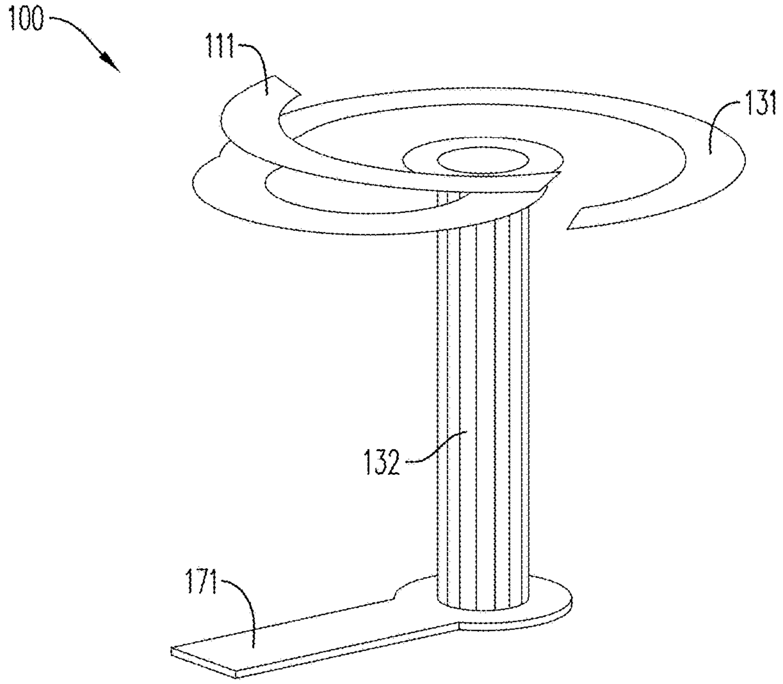

FIG. 2 illustrates the geometry of an example dielectric-based inverted microstrip gap waveguide, DIMGW, which consists of three stacked dielectric layers. This example DIMGW can constitute the EBG mushrooms and waveguide in the antenna element 100. A microstrip line 211 is arranged facing the mushroom-like EBG structure 231 and arranged facing a ground plane. Thus, the mushroom-like EBG structure, with an artificial magnetic conductor property, and the PEC ground, arranged at a distance smaller than a quarter wavelength from the EBG structure, make a parallel plate waveguide where no electromagnetic waves can propagate. With the microstrip line, the quasi-TEM (transverse electromagnetic) electromagnetic waves can propagate between the PEC ground and the strip line. Therefore, the mutual coupling between adjacent lines is suppressed by this gap waveguide structure, which is very helpful for the wideband feeding network design in a layout with very limited space. As a result, the DIMGW has a more compact size than conventional substrate integrated waveguides because of its Quasi-TEM mode, and less losses than the microstrip line due to no radiation loss. In addition, the whole structure of DIMWG can be easily fabricated in a multi-layer PCB process and be integrated with RF components. It is appreciated that the microstrip line can be replaced by any planar transmission line, such as coplanar transmission line.

The patch 192 may comprise conductive foil laminated on the third dielectric layer 180 and or forth dielectric layer 190. The second ground plane 191 may comprise conductive foil laminated to the fourth dielectric layer 190. The thickness of the fourth dielectric layer is preferably smaller than a quarter of the operational wavelength of the highest frequency in the frequency band, in order for the EBG structure to function property as an artificial magnetic conductor (on the surface with the patches).

The EBG structure is arranged to prevent electromagnetic radiation in a frequency band of operation from propagating from the transmission line arrangement 171 in directions other than through the feeding via and along the at least one planar transmission line. A frequency band is an interval of frequencies between a lower cutoff frequency and a higher cutoff frequency. The antenna element is arranged to transmit and receive electromagnetic signals in the frequency band of operation.

The EBG structure is not necessarily based on mushroom-like patches and via holes. Other PCB based EBG structures are also possible.

It is possible to replace the fourth dielectric layer 190 comprising an EBG structure with an air-based EBG structure. Such air-based EBG structure may, for example, be based on conductive repetitive protruding elements extending from a ground plane towards the transmission line arrangement 171. An example of such repetitive structure is taught by U.S. Ser. No. 15/311,128. An air-based EGB structure may or may not replace the third dielectric layer 180 with air as well.

To improve the impedance matching characteristic of the antenna element 100, the antenna element 100 may comprise a matching dielectric layer 90 facing the topmost complementary planar radiation element 111. Topmost here means the outermost layer of the complementary planar radiation element.

There is also disclosed herein a telecommunication or radar transceiver comprising at least one disclosed antenna element 100.

There is also disclosed herein an array antenna comprising a plurality of the disclosed antenna elements 100. According to aspects, the array antenna is a circular polarized array antenna. FIG. 6 shows an example array antenna.

General TCA antennas exhibit excellent wide bandwidth performance. This type of array utilizes the mutual coupling between elements to obtain ultra-wide bandwidth for wide beam angle scanning. According to aspects of the present disclosure, the concept of TCA is used together with the disclosed antenna element 100. The disclosed array achieves ultra-wideband performance in terms of high gain, AR, scan angle, and impedance matching.

Usually, the element spacing in TCAs is less than $0.5\lambda_{high}$ to avoid scanning anomalies at high frequencies. It is appreciated that any array size comprising a plurality of antenna elements 100 is possible. Although the element spacing in TCAs is typically less than $0.5\lambda_{high}$, it is possible to arrange a plurality of antenna elements 100 in an array in a span of element spacing, e.g., from $0.1\lambda_{high}$ to $2\lambda_{high}$. Other element spacing lengths are also possible.

The transmission line arrangements 171 of all antenna elements in the array may constitute a corporate feeding network. The feeding network is another key part of a wideband CP planar array antenna. Obviously, the design of a corporate feeding network with the concept of TCA is a difficult task due to the relatively small element spacing of TCAs. Substrate integrated waveguide (SIW) or microstrip line technology, which are commonly employed in prior art, are not suitable here since there is not enough space for a feeding network based on SIW in the TCA. In addition, the bandwidth limitation of SIWs makes it difficult to achieve an ultra-wide bandwidth of the feeding network. Conventional microstrip line technology can be used to design ultra-wideband feeding networks. However, such networks have drawbacks in mmWave bands, such as the unwanted radiation losses and mutual coupling between adjacent lines. Therefore, the dielectric-based inverted microstrip gap waveguide (DIMGW) technology is preferably adopted in the feeding network of the disclosed array antenna.

The corporate feeding network designed with DIMGW technology is composed of microstrip lines, a PEC ground (the second ground plane) and an EBG structure. The radiation elements are connected to the feeding network by feeding vias through the first dielectric layer 140, the first ground plane 151, and the second dielectric layer 160.

It is appreciated that the one or more transmission line arrangements may be arranged in other configurations than a corporate feeding network, such as multiple feeding networks for groups of antenna elements or beam steering networks. Optionally, the one or more transmission line arrangements comprise RF components, such as capacitors, resistors, and inductors. Integrated RF components are also possible, such as integrated chips, ICs.

The antenna elements 100 in the disclosed array antenna may be sequentially rotated in space with respect to adjacent antenna elements. An example of sequential rotation is shown in FIG. 6. This improves the scan angles of the array antenna. More specifically, a desired radiation pattern and a good AR can be maintained at large values of the polar angle, e.g., >45°, for a wide range of azimuth angles. Herein zenith in the spherical coordinate system is perpendicular to the planar array. The improved performance comes from a more symmetrical arrangement on average for different polar angles. If all elements are arranged equally, i.e., not sequentially rotated, the same respective part of the elements are facing a certain polar angle, wherein the respective part is dependent on the specific polar angle if the element is not rotationally symmetric. A sequentially rotation average out the effect of non-rotationally symmetric elements.

One benefit of the disclosed array antenna comprising the antenna element 100 is that the feeding structure is simple compared to prior art comprising sequentially rotated antenna elements. In particular, circular polarized array antennas often require sequenced excitation of the elements with different polarization and phases, which makes the element spacing very large and therefore the array performs poorly for large scan angles. Furthermore, despite the rotation, all elements of the disclosed array antenna are fed in the same way, i.e., through the feeding vias, which is a simpler feeding arrangement compared to prior art.

The disclosed array antenna may comprise at least four antenna elements 100. In that case, the antenna elements may be arranged on a grid and wherein each element is rotated $+\varphi$ degrees relative a neighboring element in a first direction along the grid and is rotated $-\varphi$ degrees relative a neighboring element in a second direction orthogonal to the first direction. Here, $0<\varphi<180$ degrees, and preferably $80<\varphi<100$ degrees, and more preferably $\varphi=90$ degrees. Many other sequential rotation schemes are also possible to average out the effect of non-rotation symmetric elements. FIG. 6 shows an example where the antenna elements are arranged on a grid and where $\varphi=90$ degrees.

There is also disclosed herein a telecommunication or radar transceiver comprising the disclosed array antenna.

Figure 7:
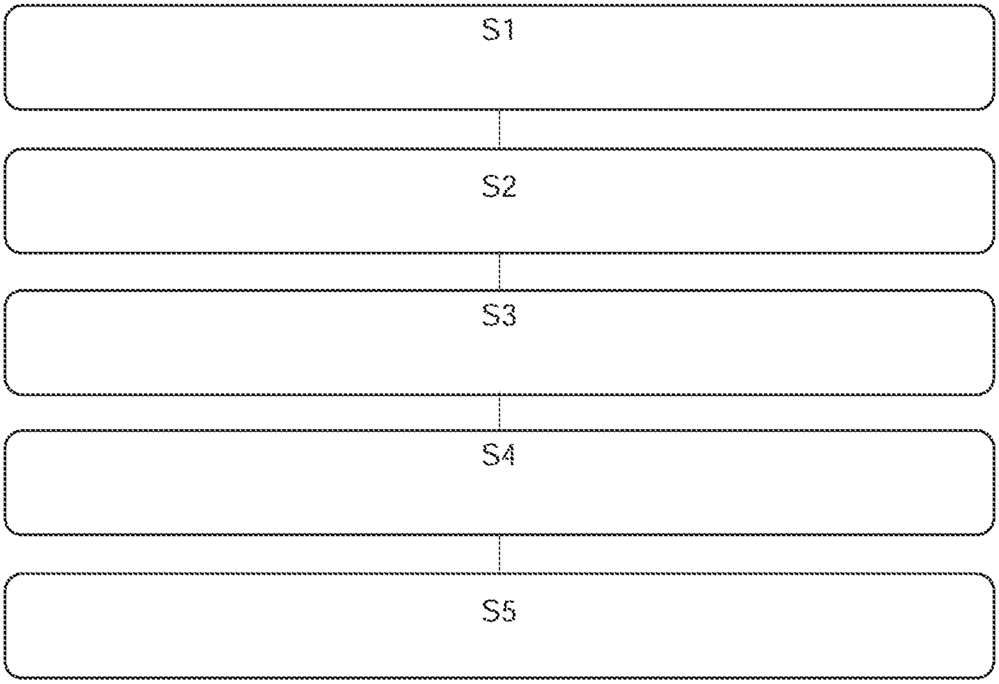
FIG. 7 is a flow chart illustrating methods.

FIG. 7 is a flowchart illustrating methods. There is illustrated a method for producing an antenna element 100 having a layered configuration, the method comprising:

- providing S1 a first ground plane 151,
- arranging S2 a first dielectric layer 140 to face the first ground plane 151,
- arranging S3 a first planar radiation element 131 to face the first dielectric layer 140,
- arranging S4 a feeding via hole 132 to electrically connect to the first planar radiation element 131 and to extend through the first dielectric layer 140 and through the first ground plane 151 without electrical contact, and
- arranging S5 at least one complementary set comprising a complementary dielectric layer 120 and a complementary planar radiation element 111 to face the complementary dielectric layer, wherein the set is arranged stackable facing the first planar radiation element 131 such that a complementary dielectric layer is arranged between two radiation elements 111, 131 in the layered configuration,
- wherein the first planar radiation element 131 constitutes a first continuous part of a spiral antenna and the at least one complementary planar radiation element 111 constitutes a continuation of the spiral antenna, thereby the first and the at least one complementary planar radiation elements 111, 131 constitute an effective spiral antenna.

The invention claimed is:

1. An antenna element for an array antenna, the antenna element having a layered configuration comprising:
- a first ground plane,
- a first dielectric layer facing the first ground plane,
- a first planar radiation element facing the first dielectric layer,
- a feeding via hole arranged electrically connected to the first planar radiation element and arranged extending through the first dielectric layer and through the first ground plane without electrical contact, and
- at least one complementary set comprising a complementary dielectric layer and a complementary planar radiation element facing the complementary dielectric layer,
- wherein the set is arranged stackable facing the first planar radiation element such that a complementary dielectric layer is arranged between two radiation elements in the layered configuration, wherein the first planar radiation element constitutes a first continuous part of a spiral antenna and the at least one complementary planar radiation element constitutes a continuation of the spiral antenna, thereby the first and the at least one complementary planar radiation elements constitute an effective spiral antenna,
- wherein a planar frame is arranged adjacent to the topmost complementary planar radiation element in the layered configuration, and is arranged to surround the effective spiral antenna, wherein the planar frame is electrically connected to the first ground plane with one or more grounding via holes extending through the first dielectric layer and the at least one complementary dielectric layer.

2. The antenna element according to claim 1, wherein the first planar radiation element is connected to at least one of the at least one complementary planar radiation element via electromagnetic coupling.

3. The antenna element according to claim 1, wherein the first planar radiation element is electrically connected to at least one of the at least one complementary planar radiation element via a connecting via hole extending through the first dielectric layer.

4. The antenna element according to claim 1, wherein the effective spiral antenna comprises a single arm with an arcuate form extending from the feeding via hole.

5. The antenna element according to claim 1, wherein the effective spiral antenna comprises a single arm with substantially constant radius and extends more than a full circle.

6. The antenna element according to claim 1, wherein the effective spiral antenna comprises a square spiral form.

7. The antenna element according to any previous claim, wherein the first planar radiation element constitutes 50-80 percent of the effective spiral antenna, preferably 60-70 percent.

8. The antenna element according to claim 1, wherein the length of the inner radius of the effective spiral antenna is substantially equal to a quarter of the wavelength of the highest frequency in a band of operation of the antenna element.

9. The antenna element according to claim 1, wherein the planar frame comprises a continuous shape.

10. The antenna element according to claim 1, further comprising:

a second dielectric layer facing the first ground plane, and a planar transmission line arrangement facing the second dielectric layer, wherein the feeding via hole is arranged to further extend through the second dielectric layer and electrically connect to the transmission line arrangement.

11. The antenna element according to claim 10, further comprising:

a third dielectric layer facing the planar transmission line arrangement, and a fourth dielectric layer facing the third dielectric layer, the fourth dielectric layer comprising an electromagnetic bandgap, EBG, structure arranged to prevent electromagnetic radiation in a frequency band of operation from propagating from the planar transmission line arrangement in directions other than through the feeding via hole and along the at least one planar transmission line arrangement.

12. The antenna element according to claim 11, wherein the EBG structure comprises a second ground plane and a plurality of EBG mushrooms, wherein each EBG mushrooms comprises a patch and a via hole, the via hole extending through the fourth dielectric layer and is configured to electrically connect the patch to the second ground plane.

13. The antenna element according to claim 1, comprising a matching dielectric layer facing the topmost complementary planar radiation element.

14. A telecommunication or radar transceiver comprising at least one antenna element according to claim 1.

15. An array antenna comprising a plurality of antenna elements according to claim 1.

16. The array antenna according to claim 15, wherein transmission line arrangements of all antenna elements constitute a corporate feeding network.

17. The array antenna according to claim 15, wherein the antenna elements are sequentially rotated in space with respect to adjacent antenna elements.

18. The array antenna according to claim 15, comprising at least four antenna elements, wherein the antenna elements are arranged on a grid and wherein each element is rotated $+\varphi$ degrees relative a neighboring element in a first direction along the grid and is rotated $-\varphi$ degrees relative a neighboring element in a second direction orthogonal to the first direction, wherein $0<\varphi<180$ degrees, and preferably $80<\varphi<100$ degrees, and more preferably $\varphi=90$ degrees.

19. A telecommunication or radar transceiver comprising the array antenna according to claim 15.

20. A method for producing an antenna element having a layered configuration, the method comprising: providing a first ground plane, arranging a first dielectric layer to face the first ground plane, arranging a first planar radiation element to face the first dielectric layer, arranging a feeding via hole to electrically connect to the first planar radiation element and to extend through the first dielectric layer and through the first ground plane without electrical contact, and arranging at least one complementary set comprising a complementary dielectric layer and a complementary planar radiation element to face the complementary dielectric layer, wherein the set is arranged stackable facing the first planar radiation element such that a complementary dielectric layer is arranged between two radiation elements in the layered configuration, wherein the first planar radiation element constitutes a first continuous part of a spiral antenna and the at least one complementary planar radiation element constitutes a continuation of the spiral antenna, thereby the first and the at least one complementary planar radiation elements constitute an effective spiral antenna, and wherein a planar frame is arranged adjacent to the topmost complementary planar radiation element in the layered configuration, and is arranged to surround the effective spiral antenna, wherein the planar frame is electrically connected to the first ground plane with one or more grounding via holes extending through the first dielectric layer and the at least one complementary dielectric layer.

* * * * *